US010046822B2

(12) United States Patent
Kurogi et al.

(10) Patent No.: US 10,046,822 B2
(45) Date of Patent: Aug. 14, 2018

(54) COVER FASTENING STRUCTURE FOR SADDLED VEHICLE

(71) Applicant: HONDA MOTOR CO., LTD., Tokyo (JP)

(72) Inventors: Nobuyuki Kurogi, Wako (JP); Shin Yokoyama, Wako (JP); Kenji Morita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/540,504

(22) PCT Filed: Jan. 29, 2015

(86) PCT No.: PCT/JP2015/052559
§ 371 (c)(1),
(2) Date: Jun. 28, 2017

(87) PCT Pub. No.: WO2016/121062
PCT Pub. Date: Aug. 4, 2016

(65) Prior Publication Data
US 2017/0361889 A1    Dec. 21, 2017

(51) Int. Cl.
*B62J 17/02*    (2006.01)
*B62J 6/02*    (2006.01)

(52) U.S. Cl.
CPC . *B62J 17/02* (2013.01); *B62J 6/02* (2013.01)

(58) Field of Classification Search
CPC ... B62J 17/02; B62J 17/04; B62J 17/06; B62J 17/065
(Continued)

(56) References Cited

U.S. PATENT DOCUMENTS 9,010,835 B2 * 4/2015 Tsukui ............... B62J 17/04
                                              296/78.1
9,656,711 B2 * 5/2017 Mikura ............... B62J 6/02
(Continued)

FOREIGN PATENT DOCUMENTS

CN        1517260 A     8/2004
EP        1 495 953 A2  1/2005
(Continued)

OTHER PUBLICATIONS

International Preliminary Report on Patentability and English translation of the Written Opinion of the International Searching Authority (Forms PCT/IB/338, PCT/IB/326, PCT/IB/373 and PCT/ISA/237), dated Aug. 10, 2017, for International Application No. PCT/JP2015/052559.
(Continued)

*Primary Examiner* — Dennis H Pedder
(74) *Attorney, Agent, or Firm* — Birch, Stewart, Kolasch & Birch, LLP

(57) ABSTRACT

A cover fastening structure for a motorcycle, including a cover member around a headlight that can be made smaller in size and, at the same time, with highly accurate fastening. The cover fastening structure for the motorcycle includes: a headlight for lighting the front side of the motorcycle; middle cowls as exterior parts for covering lateral sides of the motorcycle; a headlight under cover disposed under the headlight such as to be continuous with the middle cowls; and a center upper cowl disposed rearwardly of the headlight under cover such as to cover the lower side of the headlight. The headlight under cover includes a rearward extending wall fitted to the center upper cowl, and the rearward extending wall is provided with a cutout. The center upper cowl is provided with a solid cylindrical fitting-receiving section. The cutout of the headlight under cover and the
(Continued)

fitting-receiving section of the center upper cowl are fastened together by being fitted to each other.

18 Claims, 11 Drawing Sheets

(58) Field of Classification Search
USPC ........................................................ 296/78.1
See application file for complete search history.

(56) References Cited

U.S. PATENT DOCUMENTS

| | | | |
|---|---|---|---|
| 2008/0093147 A1 | 4/2008 | Tanaka | |
| 2014/0202782 A1* | 7/2014 | Tsukui | B60K 11/08 180/68.1 |
| 2014/0226350 A1* | 8/2014 | Mikura | B62J 6/02 362/475 |
| 2015/0266532 A1* | 9/2015 | Horiuchi | B62J 23/00 296/78.1 |

FOREIGN PATENT DOCUMENTS

| | | |
|---|---|---|
| EP | 2 017 168 A1 | 1/2009 |
| JP | 2006-35908 A | 2/2006 |
| JP | 2008-120367 A | 5/2008 |
| JP | 2009-40395 A | 2/2009 |
| TW | I269738 | 1/2007 |
| WO | WO 2009/118997 A1 | 10/2009 |

OTHER PUBLICATIONS

International Search Report issued in PCT/JP2015/052559 (PCT/ISA/210), dated Mar. 31, 2015.
Japanese Notification of Reasons for Refusal dated Nov. 14, 2017, for Japanese Application No. 2016-571605 with English machine translation.

* cited by examiner

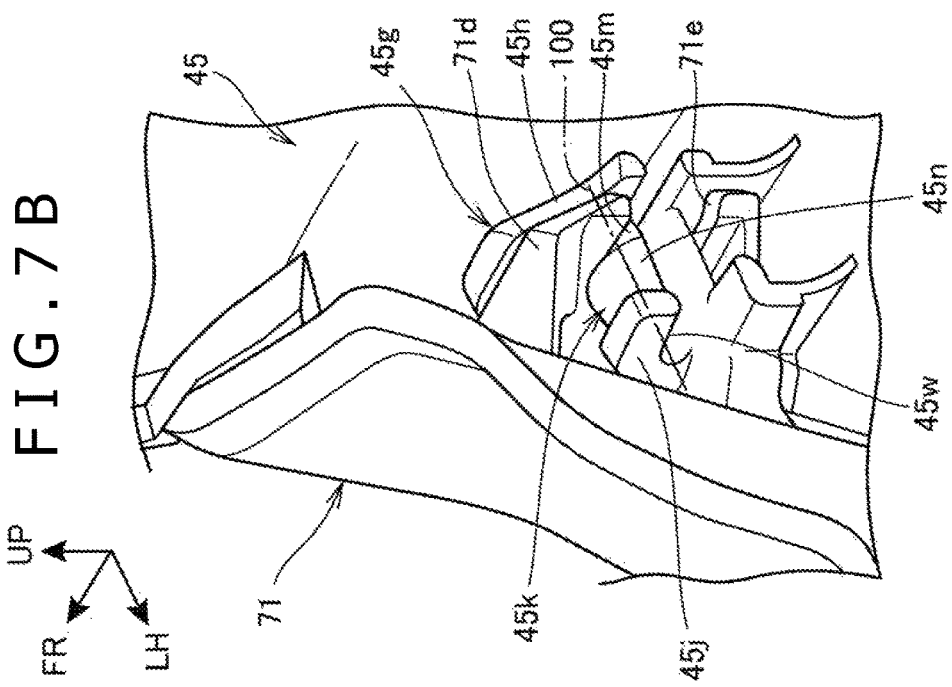
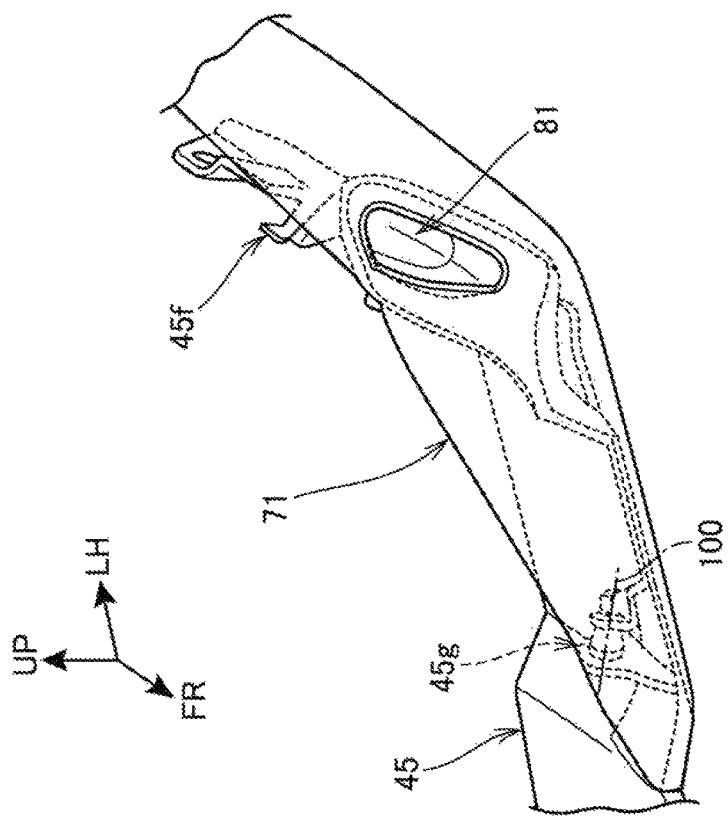

COVER FASTENING STRUCTURE FOR SADDLED VEHICLE

TECHNICAL FIELD

The present invention relates to a cover fastening structure for a saddled vehicle, the cover fastening structure being for fastening together two covers that constitute a vehicle body cover.

BACKGROUND ART

Conventionally, as a cover fastening structure for a saddled vehicle, there has been known one wherein a first cover member includes a locking projection composed of a solid cylindrical shaft portion and an umbrella-like part provided at a tip portion of the shaft portion, whereas a second cover member is provided with a locking hole, and the cover members are fastened together by inserting the locking projection into the locking hole and thereafter sliding the locking projection in a longitudinal vehicle direction (see, for example, PTL 1).

CITATION LIST

Patent Literature

[PTL 1]
Japanese Patent Laid-Open No. 2006-35908

SUMMARY

Technical Problem

In PTL 1, in order to insert the locking projection into the locking hole and thereafter slide the locking projection, a comparatively large space is needed, which leads to an increase in the size of the cover members. For instance, around a headlight at a front portion of a saddled vehicle, a duct for guiding airflow generated by traveling of the vehicle is often provided, and the vehicle body front portion receives the airflow. For securing the strength and mounting accuracy of the cover members, therefore, a fastening bolt or bolts are needed, which is liable to lead to an increase in the size of the cover member around the headlight.

It is an object of the present invention to provide a cover fastening structure for a saddled vehicle, the cover fastening structure being configured such that a cover member around a headlight can be made smaller in size and, at the same time, highly accurate fastening thereof is possible.

Solution to Problem

In order to solve the above problem, according to the present invention, there is provided a cover fastening structure for a saddled vehicle, including: a headlight (51) that lights a front side of the vehicle (10); side covers (42) serving as exterior parts that cover lateral sides of the vehicle (10); a first cover (71) disposed below the headlight (51) such as to be continuous with the side covers (42); and a second cover (45) disposed rearwardly of the first cover (71) such as to cover a lower side of the headlight (51), characterized in that the first cover (71) is provided with a fitting section (71d) that is fitted to the second cover (45), the fitting section (71d) is provided with a cutout (71e), the second cover (45) is provided with a solid cylindrical fitting-receiving section (45g), and the cutout (71e) of the first cover (71) and the fitting-receiving section (45g) of the second cover (45) are fastened together by being fitted to each other.

In the above configuration, a direction in which the cutout (71e) and the fitting-receiving section (45g) are fitted to each other may be a vehicle traveling direction, and an axis (100) of the fitting-receiving section (45g) may extend in a transverse direction.

In addition, in the above configuration, a front end of the fitting-receiving section (45g) may be provided with a projecting portion (45p) projecting forward, and transverse movement of the cutout (71e) fitted to the fitting-receiving section (45g) may be restricted by the projecting portion (45p).

Besides, in the above configuration, the fitting-receiving section (45g) may have a male taper portion (45n) tapered outward in a transverse direction, and the cutout (71e) may have a female taper shape tapered outward in the transverse direction.

In addition, in the above configuration, the cutout (71e) may be provided with a pair of horizontal portions (71f) that extend rectilinearly horizontally from an edge portion and are vertically spaced from each other, and a circular arc portion (71g) which forms a circular arc such as to interconnect the pair of horizontal portions (71f) and to which the fitting-receiving section (45g) is fitted, and an inside diameter of the circular arc portion (71g) may be greater than a distance between the pair of horizontal portions (71f).

Besides, in the above configuration, the circular arc portion (71g) may be fitted to a solid cylindrical portion (45m) adjacent to and on a transversely inner side of the male taper portion (45n) of the fitting-receiving section (45g), and the inside diameter of the circular arc portion (71g) may be smaller than an outside diameter of the solid cylindrical portion (45m).

In addition, in the above configuration, the first cover (71) and the second cover (45) may form a duct (81) through which airflow generated by traveling of the vehicle is taken into inside of the side covers (42).

Advantageous Effects of Invention

According to the present invention, the first cover includes the fitting section for fitting to the second cover, the fitting section is provided with the cutout, whereas the second cover is provided with the solid cylindrical fitting-receiving section for fitting to the first cover, and the cutout of the first cover and the fitting-receiving section of the second cover are fastened together by being fitted to each other. Therefore, the first cover can be fixed to the second cover by fitting without using any bolt, so that the first cover and the second cover can be made smaller in size. In addition, since the cutout is fitted to the solid cylindrical fitting-receiving section, highly accurate fastening is possible.

Besides, the direction in which the cutout and the fitting-receiving section are fitted to each other is the vehicle traveling direction, and the axis of the fitting-receiving section extends in the transverse direction. Therefore, the fitting-receiving section can be formed in a plane perpendicular to the traveling direction, so that an external force exerted by airflow generated by traveling of the vehicle can be received from the front side. Accordingly, the influence of vibrations exerted on the first cover and the second cover by the airflow can be suppressed.

In addition, the projecting portion projecting forward is provided at the front end of the fitting-receiving section, and transverse movement of the cutout fitted to the fitting-receiving section is restricted by the projecting portion. Therefore, with the projecting portion thus provided, it is possible to prevent the first cover and the second cover from being positionally deviated after fitting.

Besides, the fitting-receiving section has the male taper portion tapered outward in the transverse direction, and the cutout has the female taper shape tapered outward in the transverse direction. Therefore, the cutout first starts being fitted at a smaller-diameter portion on the transversely outer side of the tapered shaft portion of the fitting-receiving section, and then gradually comes to be fitted at a larger-diameter portion on the transversely inner side of the tapered shaft portion. Therefore, the cutout and the fitting-receiving section can be smoothly fitted to each other, and the fitting between the cutout and the fitting-receiving section can be increased in firmness. Accordingly, mountability (assemblability) is enhanced, and even the cover for covering a front portion of the vehicle body can be configured without using any bolt, and an increase in the size of the vehicle body cover can be restrained.

In addition, the cutout is provided with the pair of horizontal portions that extend rectilinearly horizontally from an edge portion and are vertically spaced from each other, and the circular arc portion which forms a circular arc such as to interconnect the pair of horizontal portions and to which the fitting-receiving section is fitted, and the inside diameter of the circular arc portion is greater than the distance between the pair of horizontal portions. Therefore, the circular arc portion and the fitting-receiving section can be fitted to each other after elastic deformation of the horizontal portions, the first cover and the second cover can be firmly coupled to each other, even the cover for covering a front portion of the vehicle body can be configured without using any bolt, and an increase in the size of the vehicle body cover can be restrained.

Besides, the circular arc portion is fitted to the solid cylindrical portion adjacent to and on the transversely inner side of the male taper portion of the fitting-receiving section, and the inside diameter of the circular arc portion is smaller than the outside diameter of the solid cylindrical portion. When the circular arc portion is fitted to the fitting-receiving section, therefore, the circular arc portion can constrict the fitting-receiving section by an elastic force, so that chattering is excluded. Accordingly, the cutout and the fitting-receiving section can be fastened together more firmly.

In addition, the first cover and the second cover form the duct through which airflow generated by traveling of the vehicle is taken into the inside of the side covers. By fastening through fitting, therefore, the first cover and the second cover can be made smaller in size, and the duct can be formed, so that the airflow can be taken into the inside of the side covers via a front portion of the vehicle body, to be used for cooling or the like.

BRIEF DESCRIPTION OF DRAWINGS

FIGS. 4A and 4B illustrate a center upper cowl, wherein FIG. 4A is a front view of a substantially left half of the center upper cowl, and FIG. 4B is a perspective view, from an oblique front side, of a fitting-receiving section of the center upper cowl.

FIGS. 6A to 6C illustrate a headlight under cover, wherein FIG. 6A is a right side view of the headlight under cover on the left side, FIG. 6B is a major part enlarged view of FIG. 6A, and FIG. 6C is a perspective view of a major part of the headlight under cover.

FIGS. 7A and 7B illustrate a fastened state of the headlight under cover fastened to the center upper cowl, wherein FIG. 7A is a perspective view, from an oblique front side, of the headlight under cover fastened to the center upper cowl, and FIG. 7B is a perspective view of the fastening part between the headlight under cover and the center upper cowl.

FIGS. 9A and 9B are major part enlarged views of FIG. 8, wherein FIG. 9A is a left side sectional view showing a lower portion of a headlight and a lower side thereof, and FIG. 9B is a left side sectional view of the fastening portion between the headlight under cover and the center upper cowl.

FIGS. 10A and 10B are front sectional views showing the fastening portion between the headlight under cover and the center upper cowl, wherein FIG. 10A is a front sectional view taken along line X-X of FIG. 1, and FIG. 10B is a major part enlarged view of FIG. 10A.

DESCRIPTION OF EMBODIMENT

Figure 1:
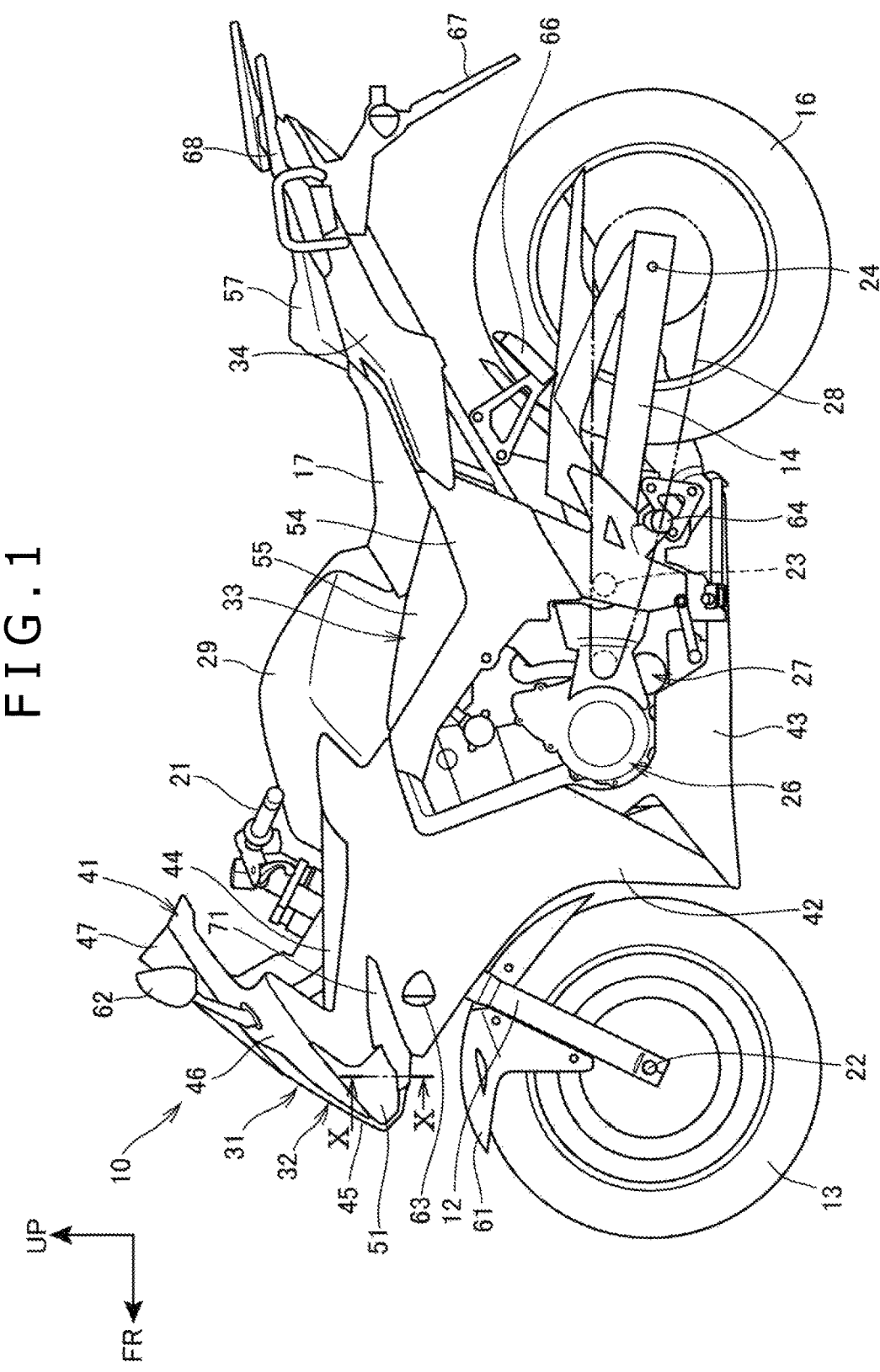
FIG. 1 is a left side view of a motorcycle provided with a cover fastening structure according to the present invention.

An embodiment according to the present invention will be described below referring to the drawings. Note that in each of the drawings symbol FR indicates the front side of a vehicle body, symbol UP indicates the upper side of the vehicle body, and symbol LH indicates the left-hand side of the vehicle body.

FIG. 1 is a left side view of a motorcycle 10 provided with a cover fastening structure according to the present invention.

The motorcycle 10 is a saddled vehicle wherein a front wheel 13 is supported on a front end portion of a body frame (not shown) through a front fork 12, a rear wheel 16 is supported on a lower portion of the body frame through a swing arm 14, and a seat 17 is supported on an upper portion of the body frame.

A bar handle 21 is attached to an upper portion of the front fork 12, and the front wheel 13 is supported on a lower portion of the front fork 12 through an axle 22. The swing arm 14 has its front end portion swingably supported on a pivot shaft 23 provided on the body frame, and the rear wheel 16 is supported on a rear end portion of the swing arm 14 through an axle 24.

An engine 26 is supported on a central portion of the body frame, and power is transmitted from a transmission 27, which is provided as one body with the engine 26, to the rear wheel 16 through a chain 28. A fuel tank 29 is supported on the body frame on the upper side of the engine 26.

The motorcycle 10 is covered with a vehicle body cover 31. The vehicle body cover 31 includes a front cowl 32, a pair of left and right body covers 33, and a pair of left and right rear seat cowls 34.

The front cowl 32 includes an upper cowl 41, a pair of left and right middle cowls 42, a pair of left and right lower cowls 43, and a pair of left and right upper inner cowls 44.

The upper cowl 41 includes a center upper cowl 45 which forms a front surface of the front cowl 32 and is located at a transversely central portion and a lower portion, and a pair of left and right side upper cowls 46 located on transversely outer sides. A windscreen 47 is mounted to the left and right side upper cowls 46. A headlight 51 is disposed on the lower side of the side upper cowls 46.

The middle cowls 42 are portions which form left and right side surfaces of the front cowl 32 and which cover a front portion of the vehicle body to a position below the axle 22 of the front wheel 13 from lateral sides of the vehicle body. The lower cowls 43 extend from their front end portions connected to lower end portions of the middle cowls 42 to lateral sides of a lower portion of the engine 26. The upper inner cowls 44 are attached to upper edge portions of the left and right middle cowls 42.

The body cover 33 is composed of a lower body cover 54 which covers the body frame from a lateral side, and an upper body cover 55 which is disposed at a portion surrounded by the lower body cover 54, the seat 17 and the fuel tank 29.

The rear seat cowls 34 cover the lower side of side edge portions of a rear portion of the driver's seat 17 and a passenger's seat 57 disposed on the rear side of the seat 17.

Reference symbol 61 in the drawing denotes a front fender that covers the front wheel 13 from above, 62 denotes a pair of left and right rearview mirrors attached to the side upper cowls 46, 63 denotes a pair of left and right front blinkers attached to front upper portions of the middle cowls 42, 64 denotes a pair of left and right driver's footrests, 66 denotes a pair of left and right passenger's footrests, 67 denotes a rear fender that covers the rear wheel 16 from above, and 68 denotes a passenger grip to be gripped by the passenger.

Figure 2:
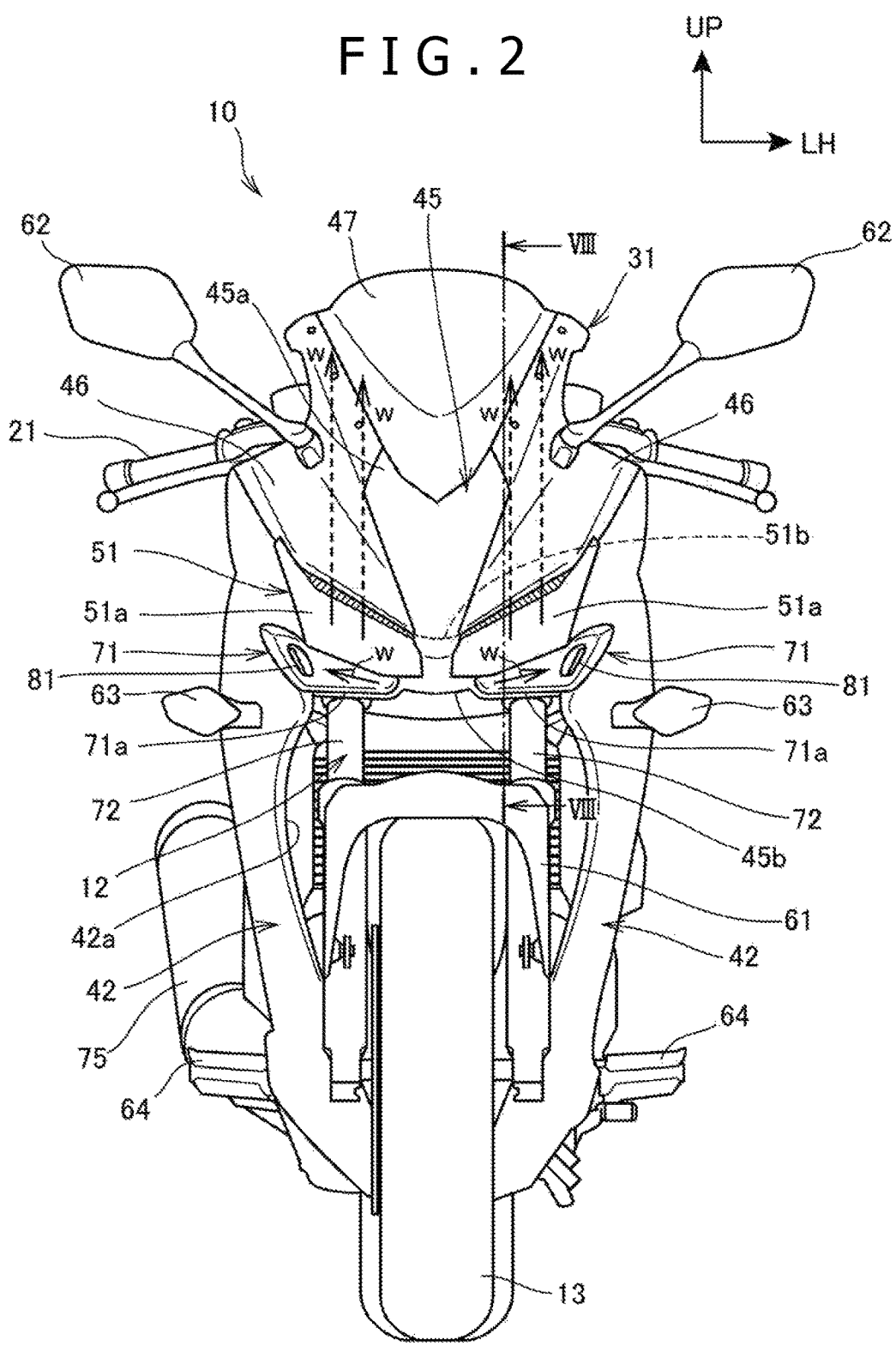
FIG. 2 is a front view of the motorcycle.

FIG. 2 is a front view of the motorcycle 10.

The headlight 51 includes a pair of left and right exposed sections 51a, 51a which are exposed to the outside and emit light, and a connection section 51b which integrally interconnects the left and right exposed sections 51a, 51a. The connection section 51b is covered with the center upper cowl 45 from the front side, so that the headlight 51 appears like a two-light system.

The pair of left and right exposed sections 51a, 51a are in left-right symmetry in shape. In front view, each exposed section 51a extends obliquely upward and transversely outward from a transversely central side.

The center upper cowl 45 includes a vertical section 45a that extends vertically such as to come across the headlight 51, and a horizontal section 45b that integrally extends substantially horizontally from a lower end of the vertical section 45a.

A pair of left and right headlight under covers 71, 71 are disposed on the lower side of the headlight 51 and on the front side of the center upper cowl 45.

The headlight under covers 71 are disposed at such positions as to overlap with a pair of left and right fork tubes 72, 72 constituting the front fork 12, in front view. The fork tube 72 has a telescopic structure, composed of a spring for supporting the weight of the motorcycle 10, and a damper for damping vibrations.

In addition, lower edges 71a of the headlight under covers 71 overlap with the left and right front blinkers 63, 63 in regard of height position, in front view.

Reference symbol 42a in the drawing denotes openings provided at front portions of the left and right middle cowls 42, 42, and 75 denotes a muffler connected to the engine 26 through an exhaust pipe.

Figure 3:
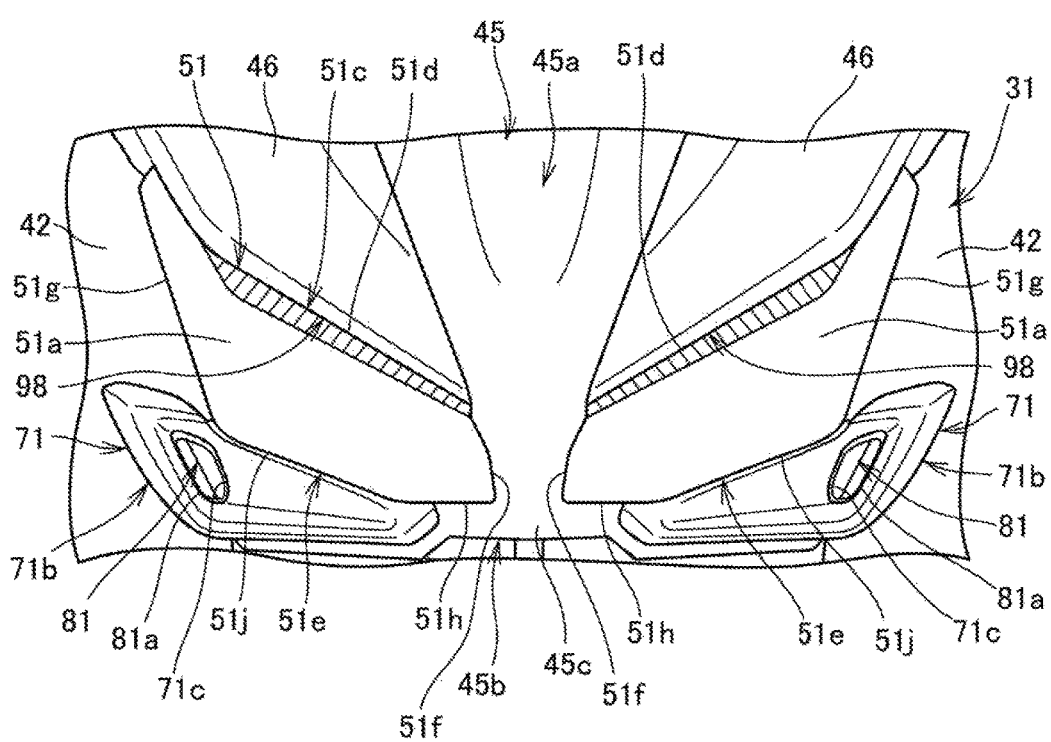
FIG. 3 is a major part enlarged view of FIG. 2.

FIG. 3 is a major part enlarged view of FIG. 2.

The exposed section 51a of the headlight 51 has a peripheral edge 51c that includes an upper edge 51d, a lower edge 51e, an inside edge 51f, and an outside edge 51g. The lower edge 51e is composed of a horizontal edge portion 51h that extends substantially horizontally from the side of the vertical section 45a of the center upper cowl 45 toward the transversely outer side, and an inclined edge portion 51j that extends substantially rectilinearly from an outside end of the horizontal edge portion 51h toward an oblique upper and transversely outer side.

The horizontal section 45b of the center upper cowl 45 has a transversely central portion 45c that extends along the horizontal edge portion 51h of the lower edge 51e of the headlight 51.

The headlight under cover 71 is a part which is substantially triangular in shape in front view and which has a protruding portion 71b protruding to a transversely outer side than the lower edge 51e of the headlight 51. The protruding portion 71b is provided with a duct insertion port 71c, and a duct 81 (in detail, an opening end portion 81a of the duct 81) through which airflow W (see FIG. 2) generated by traveling of the vehicle is taken into the inside of the vehicle body cover 31 is inserted in the duct insertion port 71c.

Figure 4A:
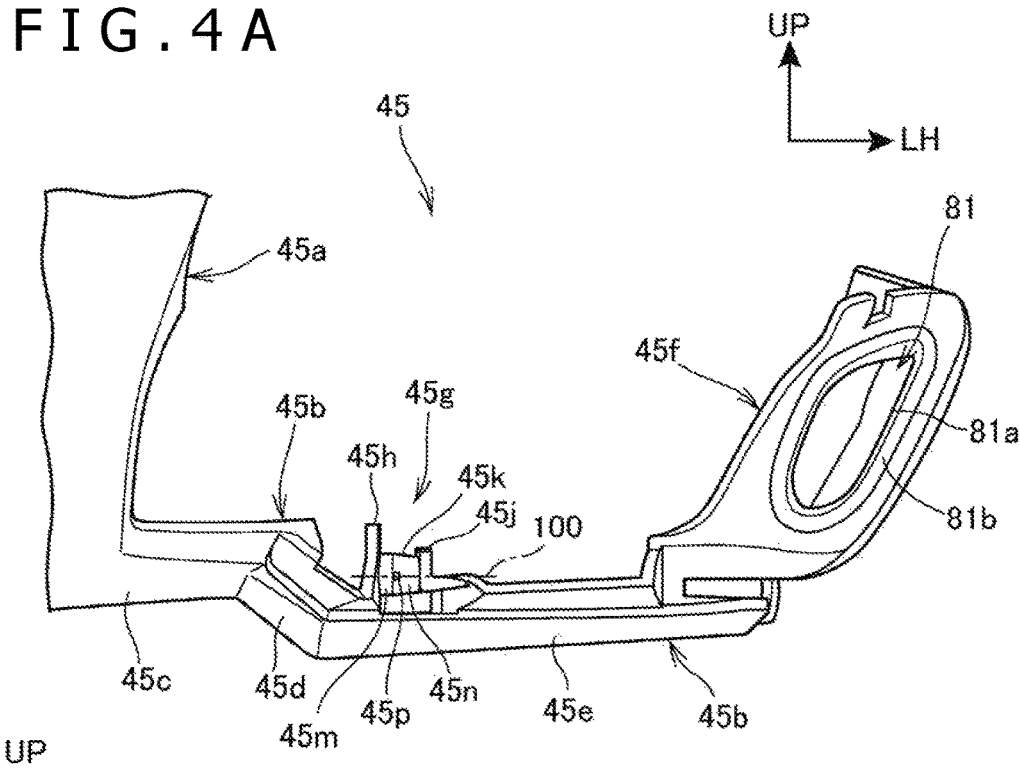
Figure 4B:
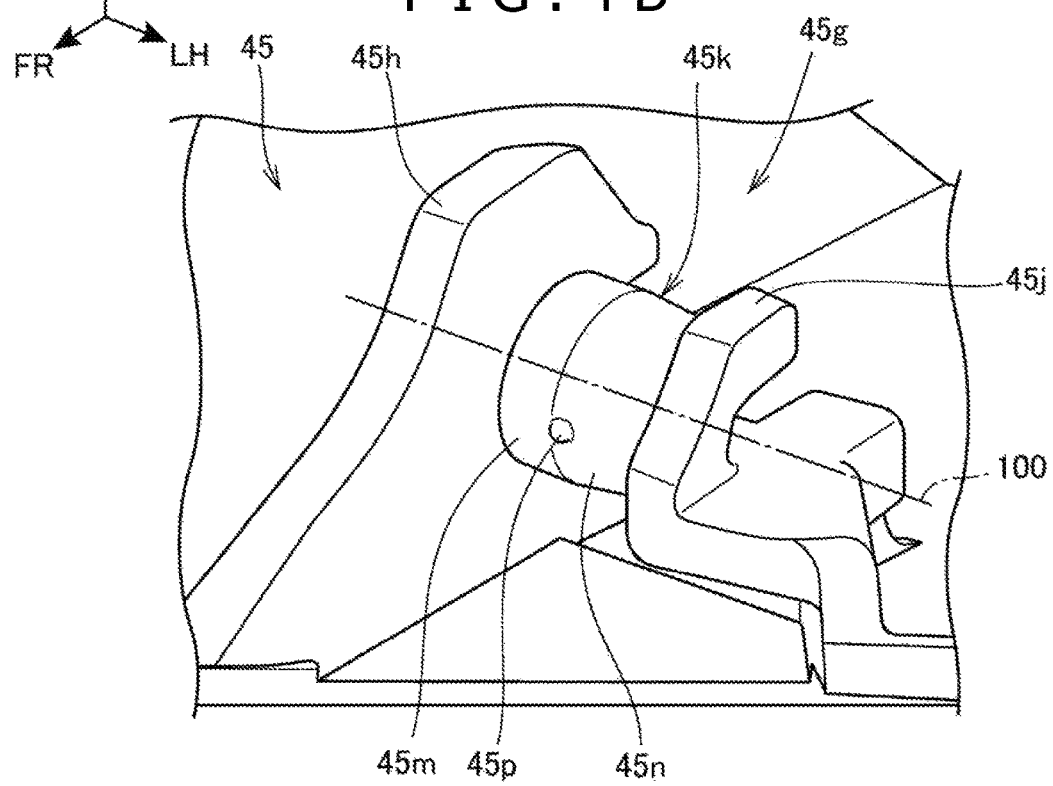

FIGS. 4A and 4B illustrate the center upper cowl 45. FIG. 4A is a front view showing a substantially left half of the center upper cowl 45, and FIG. 4B is a perspective view, from an oblique front side, of a fitting-receiving section 45g of the center upper cowl 45.

As shown in FIG. 4A, the horizontal section 45b of the center upper cowl 45 includes: a bent portion 45d bent toward an oblique lower and transversely outer side from an end portion of the transversely central portion 45c; an outside horizontal portion 45e extending further transversely outward from an end portion of the bent portion 45d; and an upward extending portion 45f extending upward from an end portion of the outside horizontal portion 45e.

The outside horizontal portion 45e is provided, at an upper portion near the bent portion 45d, with the fitting-receiving section 45g to which the headlight under cover 71 (see FIG. 3) is fitted. The upward extending portion 45f is provided with the duct 81. The duct 81 is formed, at the periphery of the opening end portion 81a, with an annular groove 81b at which the duct insertion port 71c (see FIG. 3) of the headlight under cover 71 is disposed.

In addition, the outside horizontal portion 45e or the upward extending portion 45f is provided with a fitting-receiving hole (not shown) to which a claw portion (not shown) provided in the headlight under cover 71 is fitted.

As shown in FIG. 4B, the fitting-receiving section 45g includes: an inside longitudinal wall 45h and an outside longitudinal wall 45j which extend in the longitudinal vehicle direction and are disposed with a spacing therebetween in the transverse direction; and a substantially solid cylindrical shaft portion 45k which extends in the transverse direction between the inside longitudinal wall 45h and the outside longitudinal wall 45j. The inside longitudinal wall 45h is formed to be greater than the outside longitudinal wall 45j. The shaft portion 45k is composed of a solid cylindrical shaft portion 45m where part of an outer peripheral surface of a solid cylinder is formed, and a tapered shaft portion 45n where part of an outer peripheral surface of a male taper gradually decreasing in diameter in going outward in the transverse direction is formed adjacently to the solid cylindrical shaft portion 45m. The solid cylindrical shaft portion 45m is connected to the inside longitudinal wall 45h, whereas the tapered shaft portion 45n is connected to the outside longitudinal wall 45j. At an end portion of the tapered shaft portion 45n on the side of the solid cylindrical shaft portion 45m and at a front end portion of the tapered shaft portion 45n, a projecting portion 45p projecting forward is formed as one body with the tapered shaft portion 45n. The projecting portion 45p is a part for restricting a transversely outward movement of the fitted headlight under cover 71 (see FIG. 3).

Figure 5:
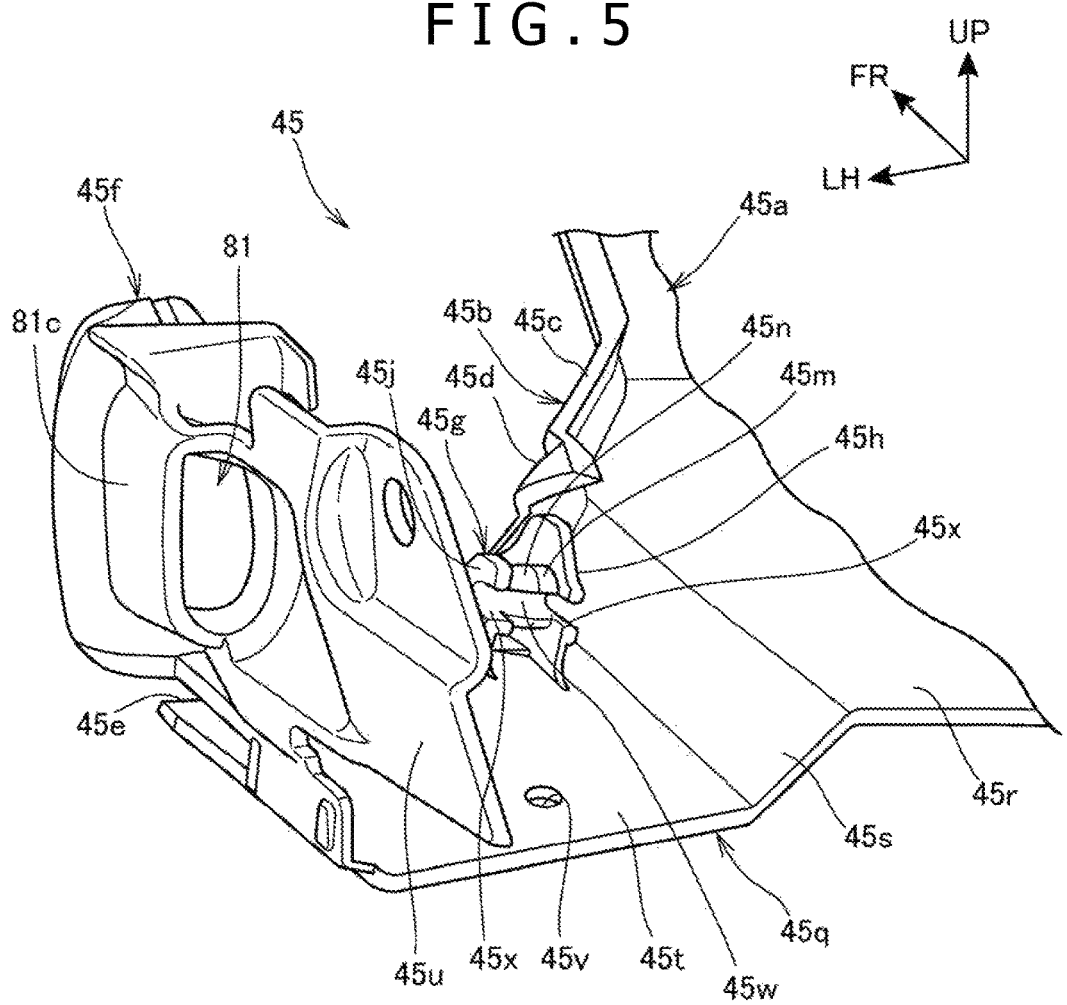
FIG. 5 is a perspective view, from an oblique rear side, of a substantially left half of the center upper cowl.

FIG. 5 is a perspective view, from an oblique rear side, of a substantially left half of the center upper cowl 45.

The center upper cowl 45 has a bottom wall 45q that extends rearward from lower edges of the vertical section 45a and the horizontal section 45b. The bottom wall 45q is composed of a central portion bottom wall 45r, a bent portion bottom wall 45s, and an outside bottom wall 45t that are included in the transversely central portion 45c, the bent portion 45d, and the outside horizontal portion 45e, respectively. The upward extending portion 45f has an upward longitudinal wall 45u extending upward from the outside bottom wall 45t.

The outside bottom wall 45t is provided with the fitting-receiving section 45g and a small screw passing hole 45v.

The fitting-receiving section 45g is formed at a rear portion thereof with a lightening hole 45w opening to the rear side, and the inside longitudinal wall 45h and the outside longitudinal wall 45j are each formed with a longitudinal wall cutout 45x which has a portion in the same shape as the profile of the lightening hole 45w at a part thereof. The small screw passing hole 45v is a part through which a small screw (not shown) for fixing the center upper cowl 45 to a headlight housing (not shown) constituting a part of the headlight 51 (see FIG. 3) is passed.

The duct 81 includes a longitudinally elongate tubular portion 81c constituting a front end portion thereof, and the upward longitudinal wall 45u provided as one body with a rear end portion of the tubular portion 81c. The upward longitudinal wall 45u is a part that, together with the headlight under cover 71 (see FIG. 6A) located on the transversely outer side thereof, forms an air passage (the air passage constitutes a part of the duct 81) located on the rear side of the tubular portion 81c.

Figure 6A:
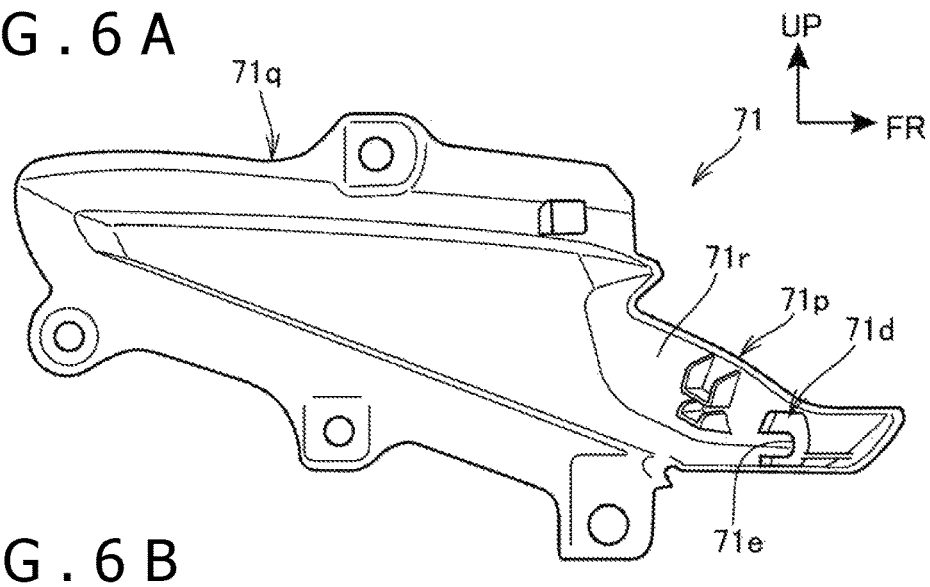
Figure 6B:
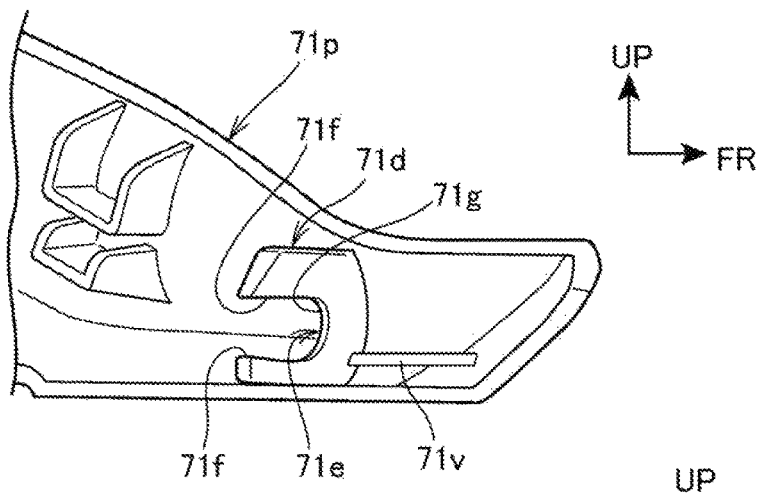
Figure 6C:
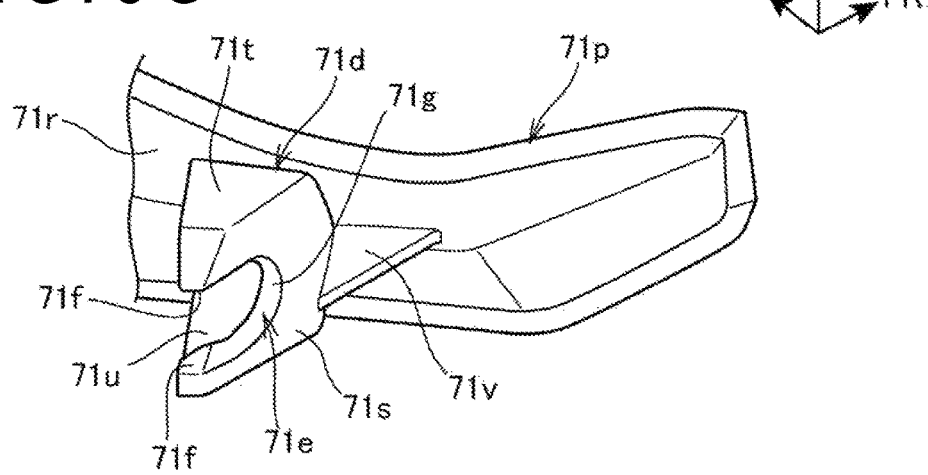

FIGS. 6A to 6C illustrate the headlight under cover 71. FIG. 6A is a right side view of the headlight under cover 71 on the left side, FIG. 6B is a major part enlarged view of FIG. 6A, and FIG. 6C is a perspective view showing a major part of the headlight under cover 71.

As shown in FIG. 6A, the headlight under cover 71 is composed of a front portion 71p which extends in a substantially transverse direction to face the front side of the vehicle body and is provided with the duct insertion port 71c (see FIG. 3), and a side portion 71q that extends toward a substantially rear side of the vehicle body from a transversely outside end portion of the front portion 71p.

At a back surface 71r of the front portion 71p, a rearward extending wall 71d as a fitting portion to be fitted to the fitting-receiving section 45g (see FIG. 4B) of the center upper cowl 45 (see FIG. 4A) is integrally formed such as to extend in the longitudinal vehicle direction.

As shown in FIG. 6B, the front portion 71p is formed with a cutout 71e to be fitted to the solid cylindrical shaft portion 45m (see FIG. 4B) of the fitting-receiving section 45g.

As shown in FIG. 6C, the rearward extending wall 71d is composed of a plate-shaped main body portion 71s formed with the cutout 71e, and triangular plate-shaped reinforcement portions 71t and 71u which are integrally provided substantially horizontally at an upper end portion and a lower end portion of the main body portion 71s. The reinforcement portions 71t and 71u are parts for reinforcing the main body portion 71s. In addition, a triangular plate-shaped reinforcement portion 71v extending from the back surface 71r is integrally connected to the main body portion 71s to reinforce the main body portion 71s.

FIGS. 7A and 7B illustrate a fastened state of the headlight under cover 71 to the center upper cowl 45. FIG. 7A is a perspective view, from an oblique front side, of the headlight under cover 71 fastened to the center upper cowl 45, and FIG. 7B is a perspective view showing a fastening part between the headlight under cover 71 and the center upper cowl 45.

In FIG. 7A, the center upper cowl 45 is provided near a transversely central portion thereof with the fitting-receiving section 45g, and is provided at a transversely outside portion thereof with an outside fitting-receiving section (not shown). The headlight under cover 71 is provided near a transversely central portion thereof with an inside fitting section (not shown) to be fitted to the fitting-receiving section 45g, and is provided at a transversely outside portion thereof with an outside fitting section (not shown) to be fitted to the outside fitting-receiving section of the center upper cowl 45. Where a fastening portion between the outside fitting section and the outside fitting-receiving section is called a first fastening portion (not shown) and a fastening portion between the inside fitting section and the fitting-receiving section 45g is called a second fastening portion, the first fastening portion and the second fastening portion are each fastened by fitting, without using any fastener such as a small screw. The first fastening portion is fastened, for example, by engagement of a claw with a hole.

As shown in FIG. 7B, the rearward extending wall 71d as an inside fitting section extending rearward is integrally provided at the back surface of the headlight under cover 71, and the rearward extending wall 71d is formed with the cutout 71e opening to the rear side. The cutout 71e is fitted to the shaft portion 45k of the fitting-receiving section 45g of the center upper cowl 45, with an interference (a margin for fastening), like close fit between an shaft and a hole. More in detail, the cutout 71e is fitted to the solid cylindrical shaft portion 45m of the shaft portion 45k.

Figure 8:
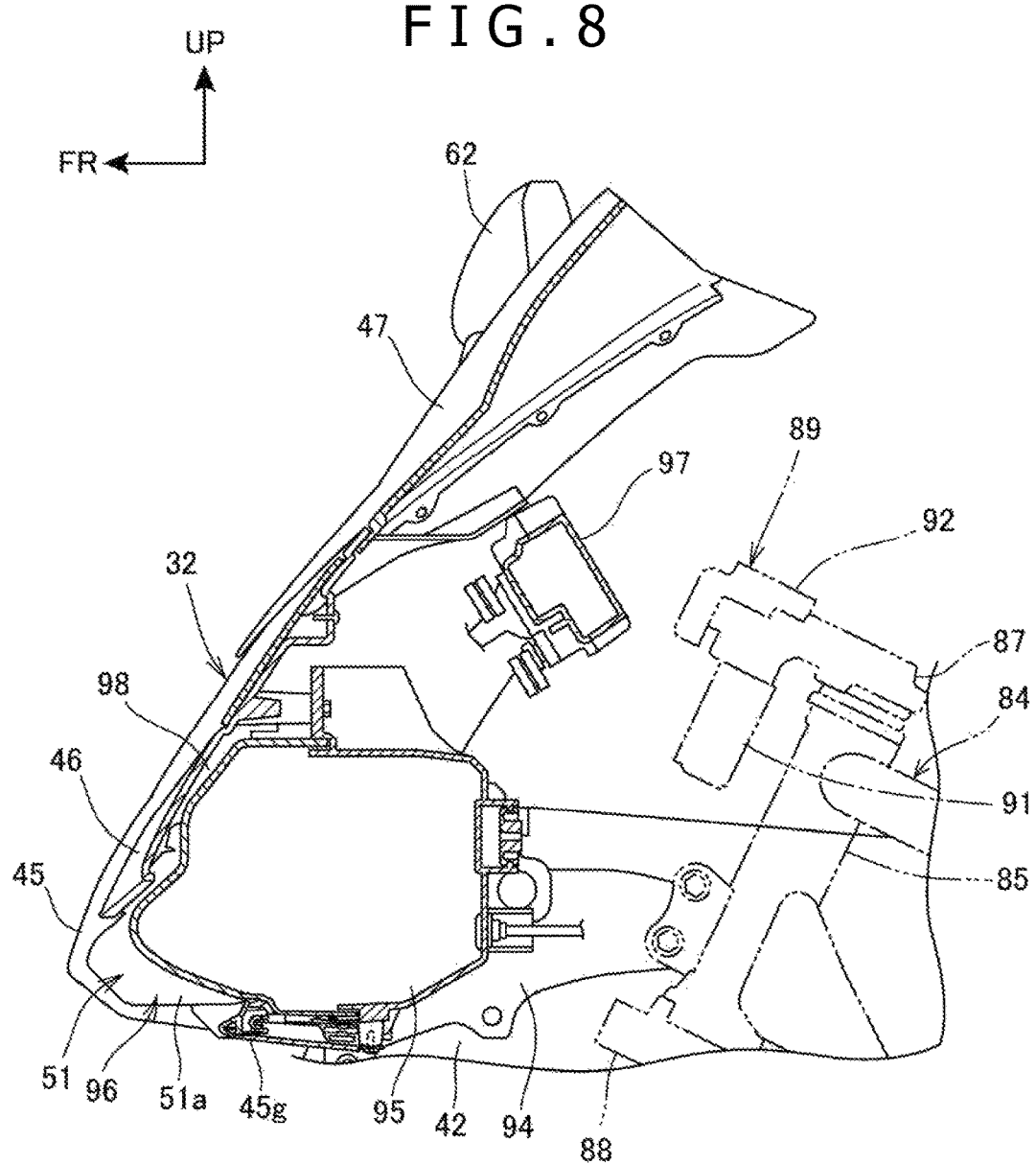
FIG. 8 is a left side sectional view taken along line VIII-VIII of FIG. 2.

FIG. 8 is a left side sectional view taken along line VIII-VIII of FIG. 2.

A body frame 84 as a skeleton of the motorcycle 10 is provided with a head pipe 85 constituting a front end portion thereof. The front fork 12 (see FIG. 1) includes a pair of left and right fork tubes 72 (see FIG. 2), a top bridge 87 and a bottom bridge 88 which interconnect upper portions and intermediate portions of the left and right fork tubes 72, and a steering stem (not shown) arranged between transversely central portions of the top bridge 87 and the bottom bridge 88. The steering stem is turnably supported on the head pipe 85. Note that reference symbol 89 denotes a main switch mounted to the top bridge 87, and the main switch 89 is provided with an ignition switch 91 and a key cylinder 92 provided at the ignition switch 91.

A headlight stay 94 that extends forward and supports the headlight 51 is mounted to a front portion of the head pipe 85.

The headlight 51 is provided with a headlight housing 95, and a lens 96 mounted to a front portion of the headlight housing 95. The headlight housing 95 is mounted to the headlight stay 94. The lens 96 is formed with the exposed sections 51a. Note that reference symbol 97 denotes a meter.

Gaps 98 are provided between the left and right side upper cowls 46 and the lens 96. With such gaps 98 formed, airflow generated by traveling of the vehicle can be guided to the rear side of the side upper cowls 46 and the windscreen 47 through the gaps 98, and generation of a negative pressure behind the front cowl 32 during the traveling of the vehicle can be restrained. By this, rolling-in of the airflow W (see FIG. 2) to the rear side of the front cowl 32 can be suppressed.

Figure 9A:
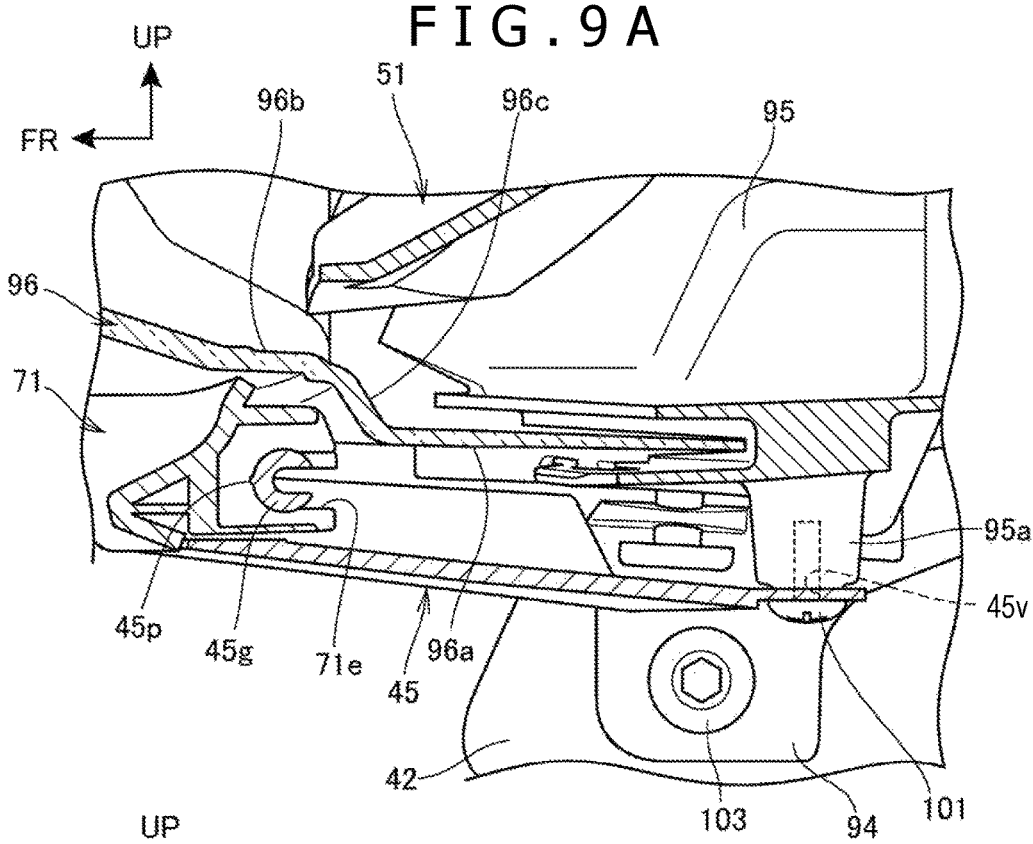
Figure 9B:
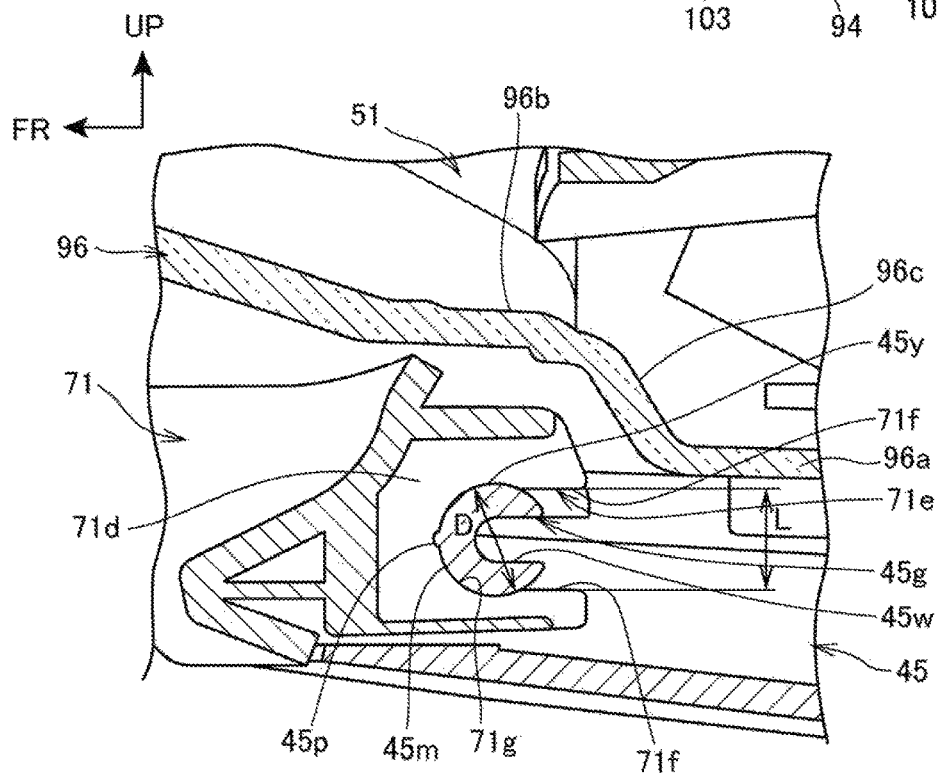

FIGS. 9A and 9B are major part enlarged views of FIG. 7. FIG. 9A is a left side sectional view showing a lower portion of the headlight 51 and the lower side thereof, and FIG. 9B is a left side sectional view showing the fastening portion between the headlight under cover 71 and the center upper cowl 45.

As shown in FIG. 9A, the headlight housing 95 of the headlight 51 is integrally formed at a lower portion thereof with a boss portion 95a to which a rear portion of the center upper cowl 45 is attached by a small screw 101. The small screw 101 is passed through the small screw passing hole 45v provided in a rear portion of the center upper cowl 45. Note that reference symbol 103 denotes a small screw for fixing the middle cowl 42 to the headlight stay 94.

As shown in FIG. 9B, the fitting-receiving section 45g of the center upper cowl 45 is a part which is substantially C-shaped in section, a part of an outer surface 45y of which forms a part of a circle, and which is provided therein with the lightening hole 45w opened to the rear side.

The cutout 71e of the headlight under cover 71 is composed of a pair of horizontal portions 71f, 71f which are formed on the side of an opening end opening to the rear side in parallel horizontally or substantially horizontally, with a vertical spacing therebetween, and a circular arc portion 71g interconnecting the front ends of the horizontal portions 71f, 71f. The minimum inside diameter D of the circular arc portion 71g is set to be large as compared to the distance L between the horizontal portions 71f, 71f. In addition, the inside diameter of the circular arc portion 71g before fastening was small as compared to the outside diameter D of the solid cylindrical shaft portion 45m of the fitting-receiving section 45g. In the fastened state shown in the figure, therefore, the circular arc portion 71g is in a state in which the fitting-receiving section 45g (more specifically, the solid cylindrical shaft portion 45m) is fastened by an elastic force generated by elastic deformation of the circular arc portion 71g. Accordingly, the cutout 71e is free of chattering in relation to the fitting-receiving section 45g, a firm fastening is realized therebetween, and chattering is hardly generated even with long-term secular change. The projecting portion 45p is in contact with or in proximity to a side surface of the cutout 71e, whereby transversely outward movement of the cutout 71e is restricted. In addition, transversely inward movement of the cutout 71e is restricted by the inside longitudinal wall 45h (see FIG. 4B).

In FIGS. 9A and 9B, the lens 96 of the headlight 51 is provided with a stepped portion 96b which is one step higher from a front end portion of a lower flat portion 96a mounted to the headlight housing 95. Under the stepped portion 96b, the fastening portion (second fastening portion) between the cutout 71e of the headlight under cover 71 and the fitting-receiving section 45g of the center upper cowl 45 is located. Note that reference symbol 96c denotes an inclined portion that integrally interconnects the lower flat portion 96a and the stepped portion 96b of the lens 96.

With the stepped portion 96b thus provided at a lower portion of the lens 96 of the headlight 51, the fastening portion between the cutout 71e and the fitting-receiving section 45g can be prevented from projecting at the stepped portion 96b, and the lower portion of the center upper cowl 45 can be made flat. As a result, an enhanced external appearance and a reduction in air resistance and/or wind noise can be realized.

Figure 10A:
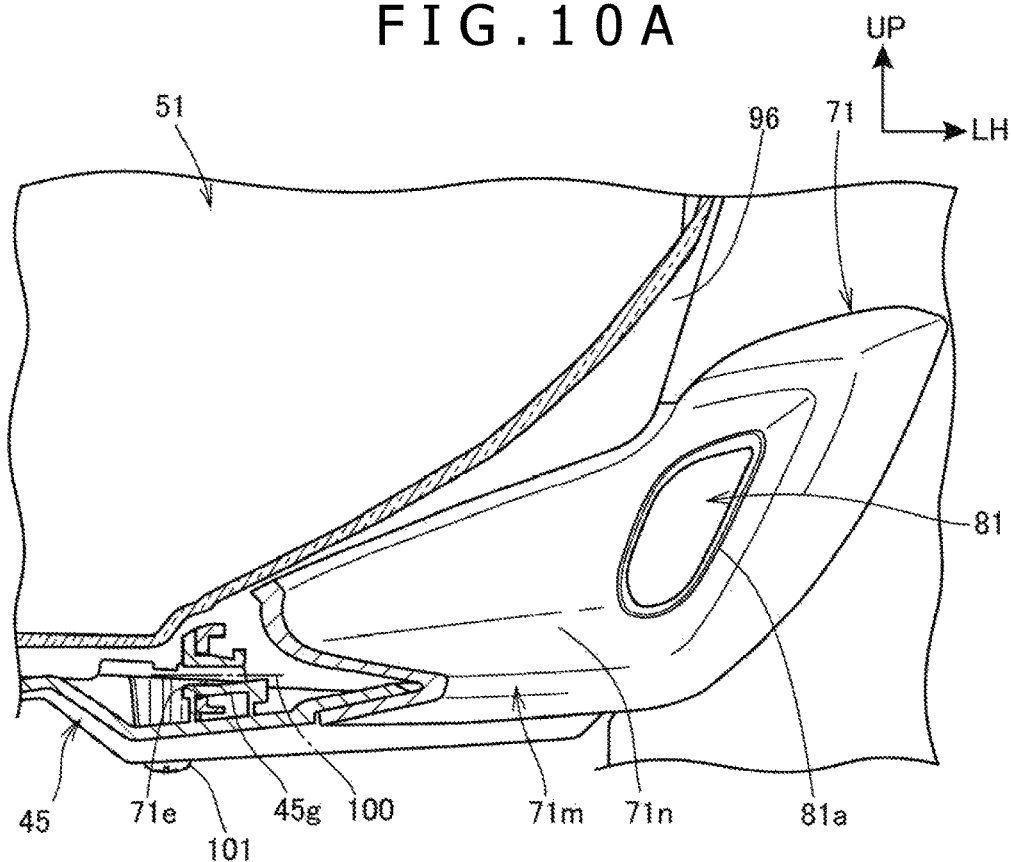
Figure 10B:
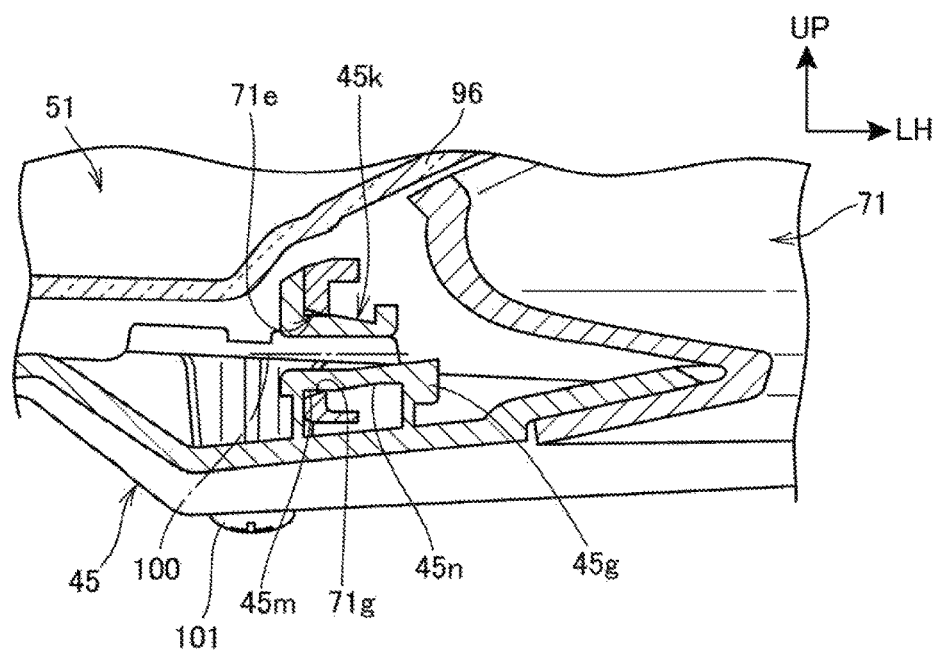

FIGS. 10A and 10B are front sectional views showing the fastening portion between the headlight under cover 71 and the center upper cowl 45. FIG. 10A is a front sectional view taken along line X-X of FIG. 1, and FIG. 10B is a major part enlarged view of FIG. 10A.

As shown in FIG. 10A, of the fastening portion between the headlight under cover 71 and the center upper cowl 45, the second fastening portion on the transversely inner side is disposed under the headlight 51. The headlight under cover 71 has its front surface 71m formed with a cover recess 71n recessed to the rear side, and the opening end portion 81a as an air intake port of the duct 81 is provided at a most largely recessed portion of the cover recess 71n. Therefore, the airflow W (see FIG. 2) can be effectively taken into the duct 81, and can be utilized for cooling of the inside of the vehicle body cover 31, etc.

As shown in FIG. 10B, the cutout 71e of the headlight under cover 71 is fastened to the solid cylindrical shaft portion 45m of the fitting-receiving section 45g of the center upper cowl 45. The inside diameter of the circular arc portion 71g of the cutout 71e gradually decreases in going outward in the transverse direction. The diameter decrease rate (variation in inside diameter per unit length in the transverse direction) of the circular arc portion 71g is set to be the same as or substantially the same as the diameter decrease rate of the tapered shaft portion 45n of the fitting-receiving section 45g. Note that reference symbol 100 in the drawings denotes an axis of the shaft portion 45k of the fitting-receiving section 45g, specifically, an axis that extends transversely while passing through the center of an outer peripheral surface forming a part of a hollow cylinder of the solid cylindrical shaft portion 45m and the tapered shaft portion 45n.

An operation of the fastening between the cutout 71e and the fitting-receiving section 45g mentioned above will be described below.

Figure 11:
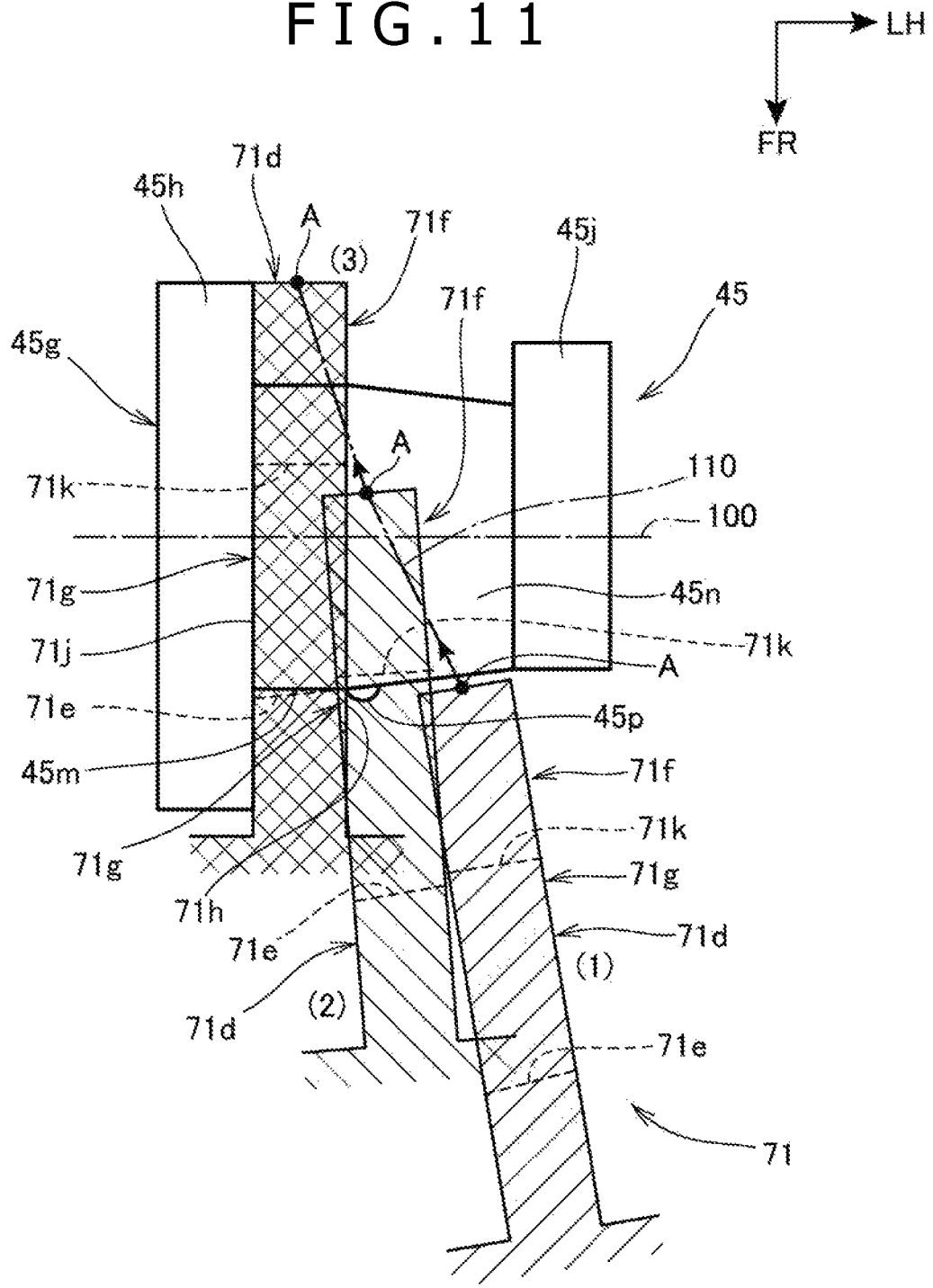
FIG. 11 is an operational view showing an operation of fastening between a cutout and the fitting-receiving section.

FIG. 11 is an operation diagram showing the operation of the fastening between the cutout 71e and the fitting-receiving section 45g.

The thick lines in the drawing represent the fitting-receiving section 45g of the center upper cowl 45, while the hatched figure is the rearward extending wall 71d of the headlight under cover 71 wherein the process of movement at the time of mounting onto the center upper cowl 45 is indicated, and the rearward extending wall 71d is formed with the cutout 71e.

A trajectory (track) 110 of a representative point A (the point indicated by a black dot) of the rearward extending wall 71d is represented by an alternate long and short dash line and arrows. Note that reference symbol 71k denotes a ridgeline (edge) as a boundary between the horizontal portion 71f and the circular arc portion 71g.

First, in a state in which a fastening operation in regard of the first fastening portion, of the first fastening portion and the second fastening portion which are two fastening portions between the center upper cowl 45 and the headlight under cover 71, is started, the rearward extending wall 71d of the second fastening portion is disposed as indicated at (1).

Next, the rearward extending wall 71d is moved from the position at (1) to the position at (2) on the oblique rear and transversely inner side as indicated by the trajectory 110. In this instance, the pair of horizontal portions 71f of the cutout 71e are forced open by making contact with the tapered shaft portion 45n of the fitting-receiving section 45g; in this case, first, they are forced open by a portion with a smaller outside diameter on the transversely outer side of the tapered shaft portion 45n, so that the forcing-open amount is small, and they are easily forced open. Then, as the rearward extending wall 71d is moved, the cutout 71e is moved to a portion with a larger outside diameter of the tapered shaft portion 45n, so that the pair of horizontal portions 71f are further forced open.

Then, when the rearward extending wall 71d is further moved, the cutout 71e comes over the projecting portion 45p located at an end portion of the tapered shaft portion 45n. Thereafter, when the circular arc portion 71g comes to be located at the tapered shaft portion 45n, since the inside diameter of the circular arc portion 71g is greater than the distance between the pair of horizontal portions 71f, the cutout 71e is smoothly fitted to the solid cylindrical shaft portion 45m, and the rearward extending wall 71d is moved to the position at (3), whereby the fastening is completed. In this instance, the fastening in regard of the first fastening portion has also been completed. Since the circular arc portion 71g of the cutout 71e has a female taper shape, it can easily come over the projecting portion 45p.

After the fastening is completed, the projecting portion 45p comes into contact with or into proximity to a side surface 71h on the left side of the rearward extending wall 71d, and the inside longitudinal wall 45h comes into contact with or into proximity to a side surface 71j on the right side of the rearward extending wall 71d, so that the rearward extending wall 71d is restricted in moving transversely outward and in moving transversely inward.

Owing to the configuration wherein not only the fitting-receiving section 45g is provided with the solid cylindrical shaft portion 45m for final fitting but also the tapered shaft portion 45n is provided adjacently to and on the transversely outer side of the solid cylindrical shaft portion 45m, the cutout 71e can be smoothly fitted by the fitting-receiving section 45g, and assemblability can be enhanced.

As illustrated in FIGS. 2, 3, 7A, 7B, 9A and 9B described above, in the cover fastening structure for the motorcycle 10 as the saddled vehicle including: the headlight 51 for lighting the front side of the motorcycle 10; the middle cowls 42 as the side covers which are exterior parts for covering the lateral sides of the motorcycle 10; the headlight under cover 71 as the first cover disposed under the headlight 51 and disposed such as to be continuous with the middle cowl 42; and the center upper cowl 45 as the second cover disposed on the rear side of the headlight under cover 71 such as to cover the lower side of the headlight 51, the headlight under cover 71 is provided with the rearward extending wall 71d as the fitting section to be fitted to the center upper cowl 45, the rearward extending wall 71d is provided with the cutout 71e, the center upper cowl 45 is provided with the solid cylindrical fitting-receiving section 45g, and the cutout 71e in the headlight under cover 71 is fastened to the fitting-receiving section 45g of the center upper cowl 45 by fitting.

According to this configuration, the headlight under cover 71 can be fixed to the center upper cowl 45 by fitting, without using any bolt, so that the headlight under cover 71 and the center upper cowl 45 can be made smaller in size.

In addition, since the cutout 71e is fitted to the solid cylindrical fitting-receiving section 45g, highly accurate fastening can be realized.

Besides, with the headlight under cover 71 made smaller in size, the headlight 51 can be made to appear relatively larger, whereby external appearance can be enhanced.

In addition, as shown in FIGS. 10A and 10B, the direction in which the cutout 71e and the fitting-receiving section 45g are fitted to each other is the vehicle traveling direction, and the axis 100 of the fitting-receiving section 45g extends in the transverse direction, so that the fitting-receiving section can be formed in a plane perpendicular to the traveling direction, and, accordingly, an external force exerted by airflow generated by traveling of the vehicle can be received from the front side. Consequently, the influence of vibrations exerted on the first cover and the second cover by the airflow can be suppressed.

Besides, as shown in FIGS. 4A, 4B, 9A, 9B and 11, the projecting portion 45p projecting forward is provided at the front end of the fitting-receiving section 45g, and transverse movement of the cutout 71e fitted to the fitting-receiving section 45g is restricted by the projecting portion 45p, so that it is possible, by providing the projecting portion 45p, to prevent the headlight under cover 71 and the center upper cowl 45 from being positionally deviated after fitting.

In addition, as shown in FIGS. 4A, 4B, 10A and 10B, the fitting-receiving section 45g has the tapered shaft portion 45n as a male taper portion tapered transversely outward, and the cutout 71e has the female taper shape tapered transversely outward. Therefore, the cutout 71e first starts being fitted at a smaller-diameter portion on the transversely outer side of the tapered shaft portion 45n of the fitting-receiving section 45g, and gradually comes to be fitted at a larger-diameter portion on the transversely inner side of the tapered shaft portion 45n. For this reason, the cutout 71e and the fitting-receiving section 45g can be smoothly fitted to each other, and the fitting between the cutout 71e and the fitting-receiving section 45g can be gradually increased in firmness. Accordingly, assemblability is enhanced, even the cover for covering a front portion of the vehicle body can be configured without using any bolt, and the vehicle body cover 31 (see FIG. 2) can be restrained from becoming larger in size.

Besides, as shown in FIGS. 4A, 4B, 7A, 7B, 9A and 9B, the cutout 71e is provided with the pair of horizontal portions 71f which extend rectilinearly horizontally or substantially horizontally from an edge portion and are vertically spaced from each other, and the circular arc portion 71g which forms a circular arc such as to interconnect the pair of horizontal portions 71f and is fitted by the fitting-receiving section 45g, with the inside diameter of the circular arc portion 71g being greater than the distance between the pair of horizontal portions 71f. Therefore, the circular arc portion 71g and the fitting-receiving section 45g can be fitted to each other after elastic deformation of the horizontal portions 71f, and the headlight under cover 71 and the center upper cowl 45 can be coupled firmly. Accordingly, even the cover for covering a front portion of the vehicle body can be configured without using any bolt, and the vehicle body cover 31 can be restrained from becoming larger in size.

In addition, the circular arc portion 71g is fitted to the solid cylindrical shaft portion 45m as a solid cylindrical portion adjacent to and on the transversely inner side of the tapered shaft portion 45n as a male taper portion of the fitting-receiving section 45g, and the inside diameter of the circular arc portion 71g is smaller than the outside diameter of the solid cylindrical shaft portion 45*m*. Therefore, when the circular arc portion 71*g* is fitted to the solid cylindrical shaft portion 45*m*, the circular arc portion 71*g* can constrict the solid cylindrical shaft portion 45*m* by elasticity, whereby chattering can be precluded. For this reason, the cutout 71*e* and the fitting-receiving section 45*g* can be fastened together more firmly. In addition, it can be ensured that chattering is hardly generated even with secular change.

Besides, as shown in FIGS. 3, 7A and 7B, the headlight under cover 71 and the center upper cowl 45 form the duct 81 through which airflow generated by traveling of the vehicle is taken into the inside of middle cowls 42. Therefore, by fastening through fitting, the headlight under cover 71 and the center upper cowl 45 can be made smaller in size, and the duct 81 can be formed, so that the airflow can be taken into the inside of the middle cowls 42 via the front portion of the vehicle body, to be used for cooling or the like.

The above-described embodiment only shows a mode of the present invention, and arbitrary modifications and applications are possible without departing from the scope of the gist of the present invention.

For instance, while the headlight under cover 71 is provided with the cutout 71*e* and the center upper cowl 45 is provided with the fitting-receiving section 45*g* as illustrated in FIG. 9B in the above embodiment, this is not restrictive; thus, the headlight under cover 71 may be provided with a hollow cylindrical fitting-receiving section and the center upper cowl 45 may be provided with a cutout to be fitted to the hollow cylindrical fitting-receiving section.

REFERENCE SIGNS LIST

10 Motorcycle (saddled vehicle)
42 Middle cowl (side cover)
45 Center upper cowl (second cover)
45*g* Fitting-receiving section
45*m* Solid cylindrical shaft portion (solid cylindrical portion)
45*n* Tapered shaft portion (male taper portion)
45*p* Projecting portion
51 Headlight
71 Headlight under cover (first cover)
71*d* Rearward extending wall (fitting section)
71*e* Cutout
71*f* Horizontal portion
71*g* Circular arc portion
81 Duct
100 Axis of fitting-receiving section

The invention claimed is:

1. A cover fastening structure for a saddled vehicle, comprising:
   a headlight that lights a front side of the vehicle;
   side covers serving as exterior parts that cover lateral sides of the vehicle;
   a first cover disposed below the headlight such as to be continuous with the side covers; and
   a second cover disposed rearwardly of the first cover such as to cover a lower side of the headlight,
   wherein the first cover is provided with a fitting section that is fitted to the second cover, the fitting section is provided with a cutout, the second cover is provided with a solid cylindrical fitting-receiving section, and the cutout of the first cover and the fitting-receiving section of the second cover are fastened together by being fitted to each other.

2. The cover fastening structure for the saddled vehicle according to claim 1,
   wherein a direction in which the cutout and the fitting-receiving section are fitted to each other is a vehicle traveling direction, and an axis of the fitting-receiving section extends in a transverse direction.

3. The cover fastening structure for the saddled vehicle according to claim 1,
   wherein a front end of the fitting-receiving section is provided with a projecting portion projecting forward, and transverse movement of the cutout fitted to the fitting-receiving section is restricted by the projecting portion.

4. The cover fastening structure for the saddled vehicle according to claim 1,
   wherein the fitting-receiving section has a male taper portion tapered outward in a transverse direction, and the cutout has a female taper shape tapered outward in the transverse direction.

5. The cover fastening structure for the saddled vehicle according to claim 1,
   wherein the cutout is provided with a pair of horizontal portions that extend rectilinearly horizontally from an edge portion and are vertically spaced from each other, and a circular arc portion which forms a circular arc such as to interconnect the pair of horizontal portions and to which the fitting-receiving section is fitted, and an inside diameter of the circular arc portion is greater than a distance between the pair of horizontal portions.

6. The cover fastening structure for the saddled vehicle according to claim 5,
   wherein the circular arc portion is fitted to a solid cylindrical portion adjacent to and on a transversely inner side of the male taper portion of the fitting-receiving section, and the inside diameter of the circular arc portion is smaller than an outside diameter of the solid cylindrical portion.

7. The cover fastening structure for the saddled vehicle according to claim 1,
   wherein the first cover and the second cover form a duct through which airflow generated by traveling of the vehicle is taken into inside of the side covers.

8. The cover fastening structure for the saddled vehicle according to claim 2,
   wherein a front end of the fitting-receiving section is provided with a projecting portion projecting forward, and transverse movement of the cutout fitted to the fitting-receiving section is restricted by the projecting portion.

9. The cover fastening structure for the saddled vehicle according to claim 2,
   wherein the fitting-receiving section has a male taper portion tapered outward in a transverse direction, and the cutout has a female taper shape tapered outward in the transverse direction.

10. The cover fastening structure for the saddled vehicle according to claim 3,
    wherein the fitting-receiving section has a male taper portion tapered outward in a transverse direction, and the cutout has a female taper shape tapered outward in the transverse direction.

11. The cover fastening structure for the saddled vehicle according to claim 2,
    wherein the cutout is provided with a pair of horizontal portions that extend rectilinearly horizontally from an edge portion and are vertically spaced from each other, and a circular arc portion which forms a circular arc such as to interconnect the pair of horizontal portions and to which the fitting-receiving section is fitted, and an inside diameter of the circular arc portion is greater than a distance between the pair of horizontal portions.

12. The cover fastening structure for the saddled vehicle according to claim 3,
wherein the cutout is provided with a pair of horizontal portions that extend rectilinearly horizontally from an edge portion and are vertically spaced from each other, and a circular arc portion which forms a circular arc such as to interconnect the pair of horizontal portions and to which the fitting-receiving section is fitted, and an inside diameter of the circular arc portion is greater than a distance between the pair of horizontal portions.

13. The cover fastening structure for the saddled vehicle according to claim 4,
wherein the cutout is provided with a pair of horizontal portions that extend rectilinearly horizontally from an edge portion and are vertically spaced from each other, and a circular arc portion which forms a circular arc such as to interconnect the pair of horizontal portions and to which the fitting-receiving section is fitted, and an inside diameter of the circular arc portion is greater than a distance between the pair of horizontal portions.

14. The cover fastening structure for the saddled vehicle according to claim 2,
wherein the first cover and the second cover form a duct through which airflow generated by traveling of the vehicle is taken into inside of the side covers.

15. The cover fastening structure for the saddled vehicle according to claim 3,
wherein the first cover and the second cover form a duct through which airflow generated by traveling of the vehicle is taken into inside of the side covers.

16. The cover fastening structure for the saddled vehicle according to claim 4,
wherein the first cover and the second cover form a duct through which airflow generated by traveling of the vehicle is taken into inside of the side covers.

17. The cover fastening structure for the saddled vehicle according to claim 5,
wherein the first cover and the second cover form a duct through which airflow generated by traveling of the vehicle is taken into inside of the side covers.

18. The cover fastening structure for the saddled vehicle according to claim 6,
wherein the first cover and the second cover form a duct through which airflow generated by traveling of the vehicle is taken into inside of the side covers.

* * * * *